Nov. 24, 1931.  S. J. KRIVIG  1,833,219
TOOTH MOUNT
Filed Dec. 27, 1929
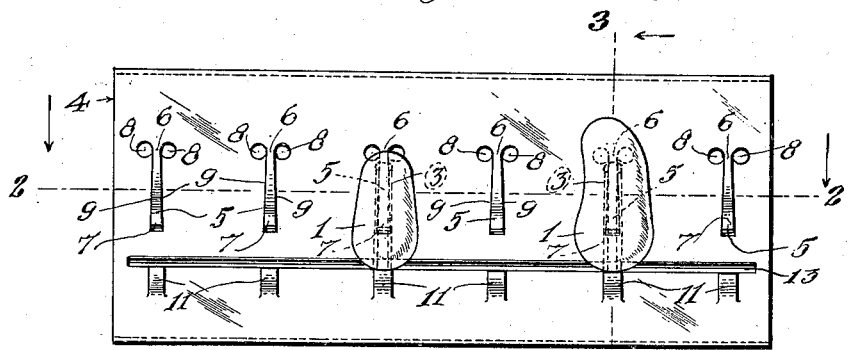
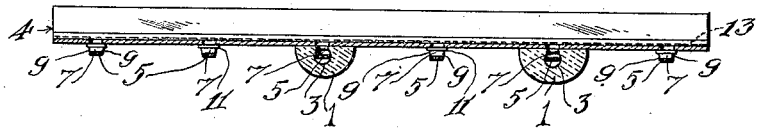
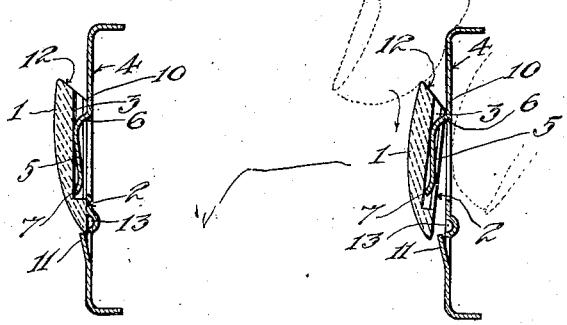
INVENTOR
Stephen J. Krivig,
BY
ATTORNEYS Patented Nov. 24, 1931

1,833,219

UNITED STATES PATENT OFFICE

STEPHEN J. KRIVIG, OF HILLSIDE, NEW JERSEY, ASSIGNOR TO BAKER & COMPANY, INC., A CORPORATION OF NEW JERSEY

TOOTH MOUNT

Application filed December 27, 1929. Serial No. 416,803.

This invention relates in general to a holder or mount for artificial teeth for shipping and display purposes which includes a card or plate, usually of metal, having projecting therefrom a plurality of spring tongues or prongs over which are slipped the teeth having openings on their lingual sides to receive said tongues, whereby the teeth are clamped against the card by said tongues and held against displacement by friction caused by the resiliency of the tongues.

In known mounts of this general character the prongs or tongues are stamped from the card or plate, and to provide sufficient strength to exert the necessary friction, the bases of the tongues where they join the plate are wedge-shaped or reenforced. The openings in the teeth, however are straight or untapered so that often as a tooth is placed on the tongues the edges of the opening in the tooth are brought into wedging relation to said wedge-shaped portions of the tongues and become cracked or chipped. Furthermore, the tongues cannot be made strong enough to prevent the teeth becoming displaced from the card during shipping or handling so that loss and commingling of the loose teeth results. Also, the tongues are sometimes so strong as to exert injurious strains on the teeth.

One object of my invention is to provide a tooth mount of the general character described embodying novel and improved features of construction whereby the teeth shall be positively held on the mount with little possibility of accidental displacement of the teeth during shipping or handling of the mount.

Another object is to provide such a mount wherein the tongues or prongs are so constructed that all possibility of the teeth being cracked or chipped by engagement with the tongues is eliminated.

Other objects are to provide a tooth mount of this character embodying a novel construction whereby the teeth can be easily and quickly removed when desired; to provide such a mount having the tongues so constructed that the teeth can be easily placed thereon, and combined with lugs or projections to be engaged by the edge of the tooth so that the tooth is held against longitudinal sliding from the tongue, and to obtain other advantages and results as will be brought out by the following description.

Referring to the accompanying drawings in which corresponding and like parts are designated throughout the several views by the same reference character, Figure 1 is a top plan view of a tooth mount embodying my invention, showing several teeth applied to the tongues thereof.

Figure 2 is a longitudinal sectional view on the line 2—2 of Figure 1.

Figure 3 is a transverse vertical sectional view on the line 3—3 of Figure 1, and Figure 4 is a similar view showing one manner of removing a tooth from the mount.

Specifically describing the illustrated embodiment of the invention, the teeth which the mount embodying my invention is intended to support or hold, comprise a body portion 1 having a flat lingual surface 2 in which is formed an undercut or substantially dove-tail shaped securing groove 3 which is utilized for the reception of anchoring pins in securing the teeth and the backings which are applied thereto, in a denture. These grooves are substantially straight or untapered from one end to the other, and, in accordance with the invention are also utilized for securing the teeth on the mount.

This mount includes a card or plate 4, preferably formed of sheet metal, and having stamped therefrom a plurality of tongues 5 projecting from one side thereof with one end 6 integrally connected to the body of the plate and the other end 7 in spaced relation thereto. The metal of the plate is preferably resilient so that the tongues 5 are also resilient. To increase the resiliency of the tongues so that they shall exert only slight pressure on the teeth, and to provide a maximum resistance to breaking of the tongues at their bases due to repeated flexing of the tongues, portions of the plate at the bases 6 of the tongues are cut away as at 8 by forming circular openings, with the sides of the tongues merging tangentially into the sides of the openings. Also the tongues are preferably tapered from their outer ends 7 toward their bases 6, or in other words, the sides 9 of the tongues converge toward the bases as clearly indicated in Figure 1 of the drawings. The widest part of the tongues is slightly less than the width of the widest portion of the groove 3 in the artificial teeth.

In placing the teeth on the mount, one tooth is slipped over each of the tongues 5 with the tongue frictionally engaging the corresponding groove 3. The tooth may be pushed so that its upper end 10 is tight against the base portion 6 of the tongue without any possibility of a wedging action taking place which might chip or crack the tooth. The tongues then serve to hold the teeth against the body of the plate 4, but the resiliency of the tongues is such that there is no injurious strain exerted on the teeth or the edges of the grooves 3 therein.

To prevent dislodgment of the teeth from the tongues, the plate is provided with a projection or lug 11 for each tooth in opposed relation to the end 7 of the corresponding tongue 5, and when the tooth is slipped on the tongue, the occlusal or biting edge of the tooth contacts with the end of the lug, whereby the tooth is held against sliding off the prong.

It will be noted that the root end 10 of the tooth is beveled at 12, and the tooth can be easily removed from the tongue which supports it by pressing upon the end 12 of the tooth between the thumb and index finger so as to tilt the tooth as shown in Figure 4 of the drawings. This operation clears the biting edge of the tooth from the lug 11 whereupon a slight push with the thumb will slide the tooth from the tongue. It may also be desirable to provide a depression 13 in the plate adjacent the ends 7 of the tongues which is overlapped by the biting edges of the teeth, so that the finger nail can be slipped beneath the teeth to facilitate lifting them above the lugs 11 and sliding the teeth from the tongues. The lugs 11, in addition to holding the teeth, have the function of alining the biting edges of the teeth which enhances the appearance thereof on the mount.

The stamping of the tongues from the plate, the formation of the lugs 11 and the depression 13 may be accomplished at the same time or in one operation, whereby the expense of making the mount is small.

Obviously the details of construction, may be modified and changed by those skilled in the art without departing from the spirit or scope of the invention and therefore I do not desire to be understood as limiting myself except by the following claims when construed in the light of the prior art.

Having thus described my invention, what I claim is:

1. A tooth mount comprising a plate upon which a tooth having an undercut recess may be supported and having a resilient tongue punched therefrom to enter said recess and hold the tooth against the face of said plate, the sides of the tongue converging toward each other in the direction of the base of the tongue so that the width of the tongue at its base is less than that of said undercut recess to prevent jamming of the sides of said recess upon said tongue.

2. A tooth mount comprising a plate upon which a tooth having an undercut recess may be supported and having a resilient tongue punched therefrom to enter said recess and hold the tooth against the face of said plate, enlarged openings being formed in the plate adjacent and at opposite sides of the base of the tongue, and the sides of said tongue merging into the sides of the openings to increase the resiliency of the tongue and provide maximum resistance to breaking of the tongue at its base.

3. A tooth mount comprising a plate upon which a tooth having an undercut recess may be supported and having a resilient tongue punched therefrom to enter said recess and hold the tooth against the face of said plate, enlarged openings being formed in the plate adjacent and at opposite sides of the base of the tongue, and the sides of the tongue converging toward each other in the direction of the base of the tongue and merging tangentially into the sides of said openings so that the width of the tongue at its base is less than that of said undercut recess and the resiliency of the tongue is increased and the tendency to breaking of the tongue at its base is reduced.

4. A tooth mount comprising a plate upon which a tooth having an undercut recess and a beveled root end may be supported and having a resilient tongue projecting therefrom with its sides converging toward its base and arranged to enter said recess and hold the tooth against the face of said plate, the resiliency of said tongue being such that said tooth may be tilted and said tongue sprung away from the face of the plate by pressure upon said root end of the tooth to facilitate removal of the tooth from the tongue.

5. A tooth mount comprising a plate upon which a tooth having an undercut recess may be supported and having a resilient tongue punched therefrom to enter said recess and hold the tooth against the face of said plate, portions of the plate adjacent and at opposite sides of the base of the tongue being cut away to increase the resiliency of the tongue, and a projection on the face of the plate adjacent the free end of the tongue to be engaged by the tooth and hold the tooth against sliding from the tongue, the face of the plate having a depression beneath the end of the tooth to admit of the insertion of a finger nail under the tooth and facilitate removal thereof from the tongue.

6. A tooth mount comprising a plate upon which a tooth having an undercut recess may be supported and having a resilient tongue projecting therefrom with its sides converging toward its base and arranged to enter said recess and hold the tooth against the face of said plate, the face of the plate having a depression beneath the end of the tooth to admit of the insertion of a finger nail under the tooth and facilitate removal thereof from the tongue.

STEPHEN J. KRIVIG.